(12) United States Patent
Oda

(10) Patent No.: US 6,383,268 B2
(45) Date of Patent: May 7, 2002

(54) AIR CLEANER

(75) Inventor: Kouichi Oda, Kariya (JP)

(73) Assignee: Toyoda Boshoku Corporation, Kariya (JP)

( * ) Notice: Subject to any disclaimer, the term of this patent is extended or adjusted under 35 U.S.C. 154(b) by 0 days.

(21) Appl. No.: 09/774,593

(22) Filed: Feb. 1, 2001

(30) Foreign Application Priority Data

Feb. 10, 2000 (JP) ........................................ 2000-033685
Dec. 21, 2000 (JP) ........................................ 2000-389148

(51) Int. Cl.[7] .............................................. B01D 29/56
(52) U.S. Cl. ...................... 96/134; 96/139; 55/385.3; 55/504; 55/511
(58) Field of Search .................... 96/134, 138, 139, 96/147; 55/320, 332, 385.3, 495, 502, 503, 504, 511, DIG. 19; 123/573; 210/445

(56) References Cited

U.S. PATENT DOCUMENTS

| | | | |
|---|---|---|---|
| 2,825,424 A | * | 3/1958 | Gross |
| 4,921,512 A | * | 5/1990 | Maryyanek et al. |
| 4,961,764 A | * | 10/1990 | Develle et al. ............. 55/385.2 |
| 5,022,901 A | * | 6/1991 | Meunier ....................... 55/502 |
| 5,158,077 A | * | 10/1992 | Sundstrom |
| 5,620,505 A | * | 4/1997 | Koch et al. ................... 55/502 |
| 5,879,423 A | * | 3/1999 | Luka et al. ................... 55/502 |
| 6,231,630 B1 | * | 5/2001 | Ernst et al. ................. 55/385.3 |
| 6,319,307 B1 | * | 11/2001 | Shanks et al. ................. 96/135 |

FOREIGN PATENT DOCUMENTS

JP U 61-58676 4/1986

* cited by examiner

Primary Examiner—Duane Smith
Assistant Examiner—Frank M. Lawrence
(74) Attorney, Agent, or Firm—Oliff & Berridge, PLC

(57) ABSTRACT

An air cleaner wherein an element for filtering intake air and an absorber member for absorbing fuel vapor are disposed within a housing. Within the housing, a stopper portion for tentatively attaching the absorber member and a seat portion capable of receiving the absorber member at a side opposite from the stopper portion are formed near a site where the element is mounted. The element or the absorber member has a presser portion that retains the absorber member in a state where the absorber member is pressed against the seat portion, when the element is mounted within the housing.

9 Claims, 5 Drawing Sheets

AIR CLEANER

INCORPORATION BY REFERENCE

The disclosure of Japanese Patent Application Nos. 2000-033685 filed on Feb. 10, 2000 and 2000-389148 filed on Dec. 21, 2000, including the specifications, drawings and abstracts are incorporated herein by reference in their entirety.

BACKGROUND OF THE INVENTION

1. Field of the Invention

The invention relates to an air cleaner having a function of absorbing fuel vapor leaking from an intake system of an internal combustion engine.

2. Description of the Related Art

As an air cleaner of the aforementioned kind, an art disclosed in, for example, Japanese Utility Model Application Laid-Open No. SHO 61-58676, is known. In this related art, an air cleaner element and an adsorption filter for absorbing fuel vapor are disposed in an air cleaner housing. Although the laid-open application does not clearly teach a structure for mounting and retaining the adsorption filter to an inner wall of the housing, it can easily be understood that the adsorption filter and the element are separately mounted to the inner wall of the housing. Based on this structure, it is conceivable that a means, such as firm fitting, welding or the like, is employed for mounting the adsorption filter to the housing inner wall.

Since the adsorption filter and the element are separately mounted to the housing as mentioned above, the workability is not good. Furthermore, if the adsorption filter mounting means is a fitting means, a predetermined fitting clearance is naturally needed, so that the adsorption filter, after being mounted, may suffer rattling, which is a factor of noise. If the mounting means is a welding means, the rattling of the adsorption filter is eliminated, but the mounting operation becomes complicated. Furthermore, regardless of which one of a firm fitting means or a welding means is employed, it is difficult to separate the adsorption filter from the housing for the recycling of the air cleaner, or the like.

SUMMARY OF THE INVENTION

Accordingly, it is an object of the invention to improve workability by making it possible to mount two members, that is, an air cleaner element and an absorber member for absorbing fuel vapor, in a due state merely by mounting the air cleaner element within a housing of an air cleaner, and to simplify the mounting of the absorber member without allowing the rattling thereof, and to relatively facilitate the separation of the absorber member from the housing through the use of a tool or the like for the recycling of the air cleaner, or the like.

A first aspect of the invention is an air cleaner wherein an element for filtering intake air and an absorber member for absorbing fuel vapor are mounted. Within the housing, a stopper portion for tentatively attaching the absorber member and a seat portion capable of receiving the absorber member at a side opposite from the stopper portion are formed near a site where the element is mounted. The element or the absorber member has a presser portion that retains the absorber member in a state where the absorber member is pressed against the seat portion, when the element is mounted within the housing.

According to this construction, by tentatively attaching the fuel vapor absorber member within the housing through the use of the stopper portion and by, while maintaining the state, mounting the element to the housing, it is possible to mount the two members, that is, the element and the absorber member, in a due state. Therefore, the workability in mounting the two members improves. Furthermore, although the mounting of the absorber member is a simple operation of tentatively attaching the absorber member as mentioned above, the absorber member is retained in a state that allows no rattling after the mounting thereof is completed. For the recycling of the air cleaner or the like, the housing and the absorber member can be relatively easily separated from each other by using a tool or the like after the element is detached from the housing.

In the above-described aspect, the stopper portion may have a protruded shape having a size that allows the stopper portion to retain an outer peripheral portion of the absorber member to an inner wall of the housing to such a degree that the outer peripheral portion does not fall apart from the housing, and the seat portion may be an end portion of a rib extending on an inner wall of the housing substantially in a direction of a flow of the intake air.

Therefore, neither the stopper portion nor the seat portion increases the resistance against the flow of intake air within the housing. Hence, regardless of whether the absorber member is used, the housing and the like can be commonly used without degradations in the intake resistance characteristic and the filtering capability of the air cleaner.

Furthermore, in the above-described aspect, the presser portion of the absorber member or the element may have a rigidity corresponding to the seat portion of the housing.

Therefore, after the element is mounted, the absorber member is firmly secured by the seat portion and the presser portion, and the secured state is stable.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the invention will be described below.

Figure 1:
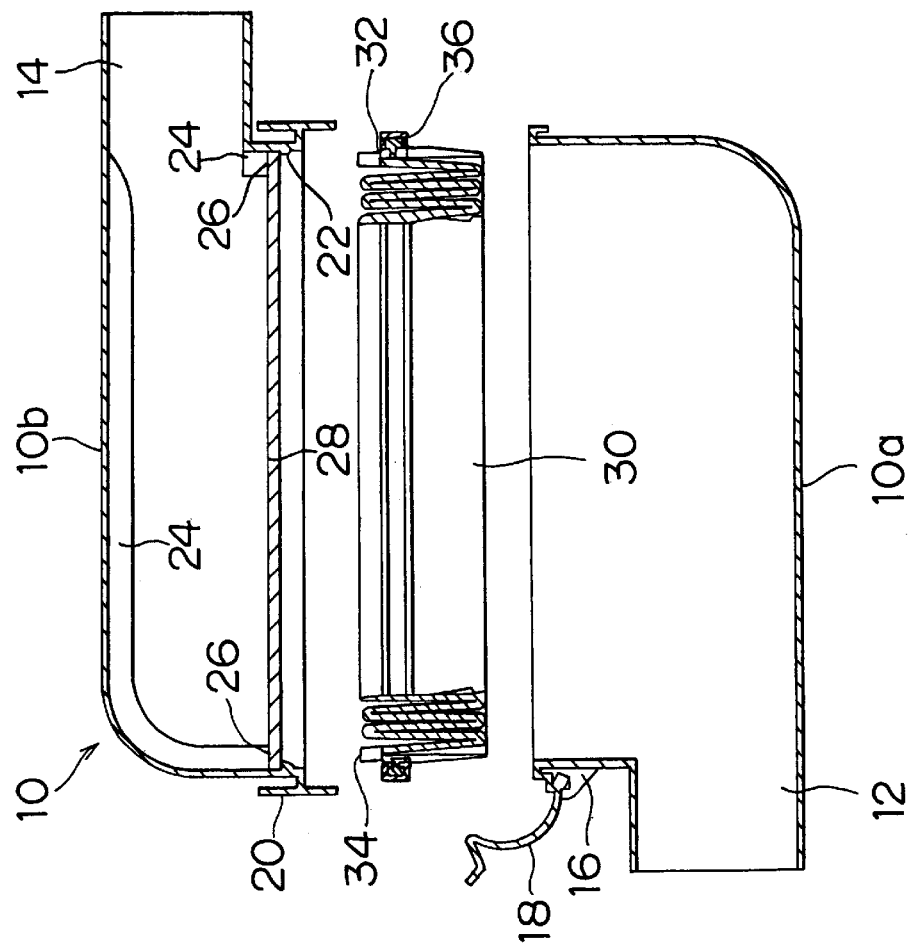
FIG. 1 is a sectional view of an air cleaner in accordance with a first embodiment of the invention, in a disassembled state.
Figure 2:
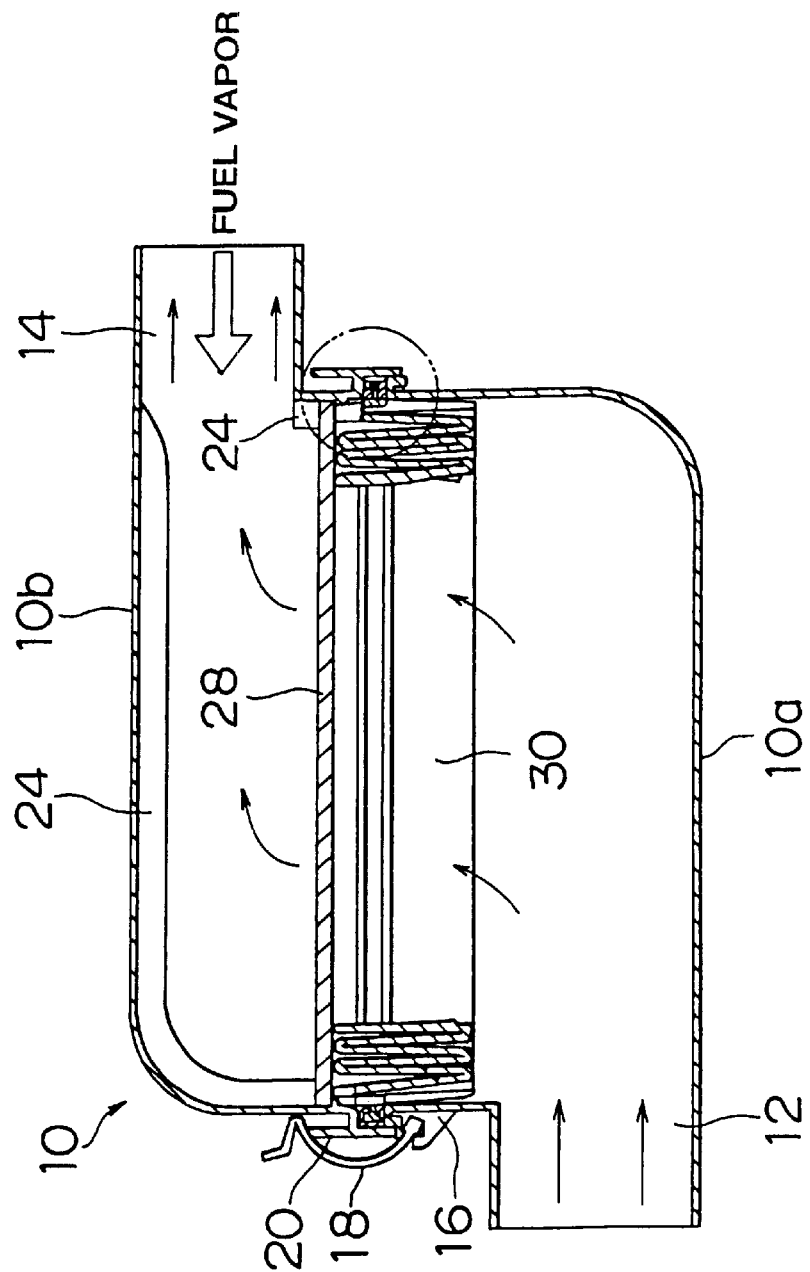
FIG. 2 is a sectional view of the air cleaner, illustrating an assembled state thereof.
Figure 3:
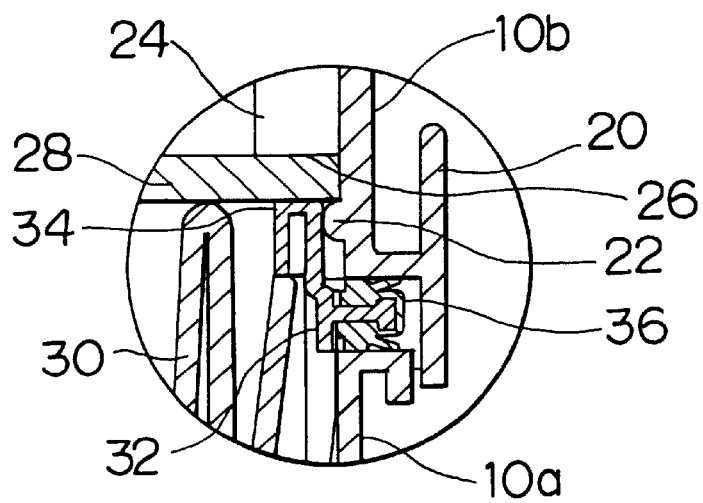
FIG. 3 is an enlarged sectional view of a portion of the air cleaner enclosed in an imaginary-line circle in FIG. 2.

A first embodiment will be described with reference to FIGS. 1 to 3. FIG. 1 is a sectional view of an air cleaner of an internal combustion engine, in a disassembled state. FIG. 2 is a sectional view of the air cleaner illustrating an assembled state thereof. FIG. 3 is an enlarged sectional view of a portion enclosed in an imaginary-line circle in FIG. 2. As show in these drawings, a housing 10 of the air cleaner is a molding formed from a synthetic resin. The housing 10 is divided into a lower housing 10a having an inlet port 12, and an upper housing 10b having an outlet port 14. Therefore, an upper face of the lower housing 10a and a lower face of the upper housing 10b are open. The housing 10 is designed so that an outer peripheral frame 32 of an air cleaner element 30 (described below) is clamped and secured between opening edges of the lower housing 10a and the upper housing 10b.

Clamps 18, each formed by a metal spring member, are attached to brackets 16 that are formed together with an outer peripheral portion of the lower housing 10a. The brackets 16 and the clamps 18 are disposed at several positions in a circumferential direction along the periphery of the lower housing 10a. A clamp receptacle 20 continuously extends in a circumferential direction on an outer periphery of the opening portion of the upper housing 10b. The clamps 18 can be engaged with and retained to the clamp receptacle 20.

As is apparent from FIG. 3, a protrusion-like stopper portion 22 is slightly protruded inward from an inner wall of the upper housing 10b, at a site near the opening thereof. The stopper portion 22 is provided for tentatively attaching and retaining a fuel vapor absorber member 28, and has an arc-like sectional shape. A shape of the stopper portion 22 with respect to the circumferential direction of the upper housing 10b may be either one of a continuous shape extending over the entire range and a discontinuous shape fragmented at predetermined intervals.

A plurality of ribs 24 are formed on the inner wall of the upper housing 10b, and extend inwardly of the stopper portion 22 of the opening portion. Each rib 24 extends along the direction of flow of intake air (indicated by arrows in FIG. 2) within the upper housing 10b. An opening-side end portion of each rib 24 forms a seat portion 26 that receives the absorber member 28 when the absorber member 28 is mounted in a due manner.

The absorber member 28 is a member for absorbing fuel vapor leaking from the side of the outlet port 14 (the engine side) and thereby preventing emission of fuel vapor to the outside the vehicle. The absorber member 28 is disposed upstream or downstream of the air cleaner element 30 for filtering external air. The absorber member 28 is tentatively attached inside the upper housing 10b by insetting it inwardly of the stopper portion 22 from the opening portion of the upper housing 10b (FIG. 1) before joining the lower housing 10a and the upper housing 10b. Therefore, the stopper portion 22 will suffice if the stopper portion 22 has a shape that facilitates the insetting of the absorber member 28 (for example, an arcuate shape in section), and has such a small amount of protrusion to prevent the absorber member 28 from falling out of the upper housing 10b.

Figure 4:
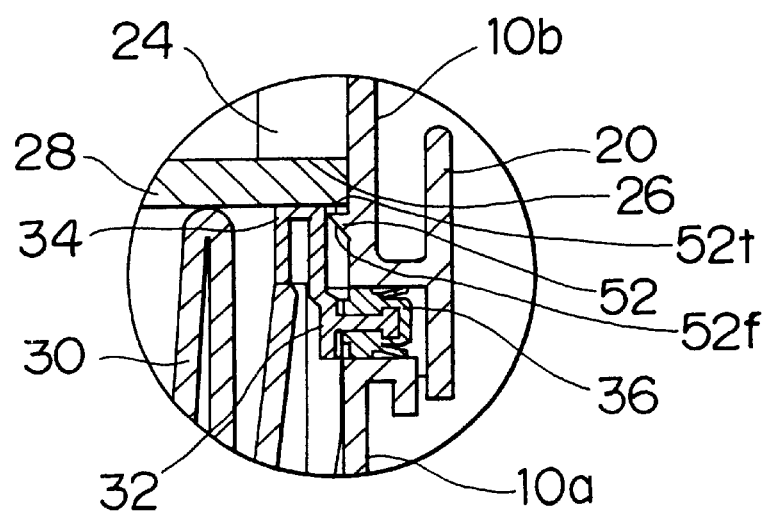
FIG. 4 is an enlarged sectional view of a portion of a housing according to a modification of the first embodiment, corresponding to the view of FIG. 3.

The stopper portion 22 may be replaced by a stopper portion 52 having a right triangular shape in section, which is provided with a tilt surface 52f and a shelf-like portion 52t as shown in FIG. 4. When inserting the absorber member 28 to the inside of the stopper portion 52 from the opening portion of the upper housing 10b, the peripheral edge of the absorber member 28 fits along the tilt surface 52f of the stopper portion 52. This makes it possible to tentatively attach the absorber member 28 between the stopper portion 52 and the seat portion 26 with ease. The tentatively attached absorber member 28 can be supported reliably by the shelf-like portion 52t of the stopper portion 52.

The shape of the stopper portion 52 with respect to the peripheral direction of the upper housing 10b may be continually formed or separately formed at a predetermined interval over the entire length. However, it is preferable to be separately formed at a predetermined interval such that the absorber member 28 can be easily removed in a recycling process.

When the absorber member 28 is tentatively attached, a fitting clearance (not shown) of a normally needed size is secured between the absorber member 28 and the seat portions 26.

Typically, a non-woven cloth is used in the air cleaner element 30, and a hard outer peripheral frame 32 formed by, for example, injection molding of a synthetic resin, is provided around an outer peripheral portion of the non-woven cloth. The outer peripheral frame 32 has a seal 36 in a portion of the frame 32 that is clamped between the opening edges of the lower housing 10a and the upper housing 10b, as is apparent in FIG. 3. The outer peripheral frame 32 has a presser portion 34 that extends beyond the stopper portion 22 and presses the absorber member 28 against the seat portions 26 when the air cleaner element 30 is mounted within the housing 10. The presser portion 34 may be formed by hardening an end portion of the non-woven cloth through pressing. An important point herein is that the presser portion 34 be provided with a rigidity that matches the rigidity of the seat portions 26.

In the air cleaner constructed as described above, the absorber member 28 is tentatively attached inside the upper housing 10b by insetting the absorber member 28 inwardly of the stopper portion 22 in the above-described manner. Next, the lower housing 10a and the upper housing 10b are joined with the seal 36 of the outer peripheral frame 32 of the air cleaner element 30 being positioned between the opening edges of the two housings 10a, 10b. The joined state is retained by hooking the clamps 18 to the clamp receptacle 20. In this manner, the air cleaner element 30 is mounted within the housing 10 and, at the same time, the presser portion 34, extending beyond the stopper portion 22, presses the outer peripheral portion of the absorber member 28 against the seat portions 26. Therefore, the mounting of the absorber member 28 to the interior of the housing 10 is also completed.

That is, by mounting the air cleaner element 30 to the housing 10, the two members, that is, the air cleaner element 30 and the absorber member 28, are mounted in the due state. Thus, the workability in mounting the two members improves. After being mounted, the absorber member 28 is pressed against the seat portions 26, while filling the aforementioned fitting clearance. Therefore, the rattling of the absorber member 28, which becomes a cause for noises or vibrations of the air cleaner, is resolved. For the recycling of the air cleaner or the like, the absorber member 28 can be relatively easily separated from the upper housing 10b by using a tool or the like after separating the lower housing 10a and the upper housing 10b from each other and detaching the air cleaner element 30.

As described above, the stopper portion 22 has an amount of protrusion that is small but sufficient to prevent the absorber member 28 from falling out of the upper housing 10b when the absorber member 28 is tentatively attached to the upper housing 10b. The ribs 24 forming the seat portions 26 extend following the direction of flow of intake air. Therefore, the presence of the stopper portion 22 and the ribs 24 does not increase the resistance against the flow of intake air within the housing 10. Hence, the housing 10 can also be applied to an air cleaner that does not employ an absorber member 28, without degrading the intake air resistance characteristic nor the filtering capability.

It should be noted herein that a conventional absorber member mounting means employing welding also has problems of degradations in the intake resistance characteristic and the filtering capability of the air cleaner because the conventional means needs relatively large welding seats within the housing and therefore sacrifices the capacity within the housing.

Figure 5:
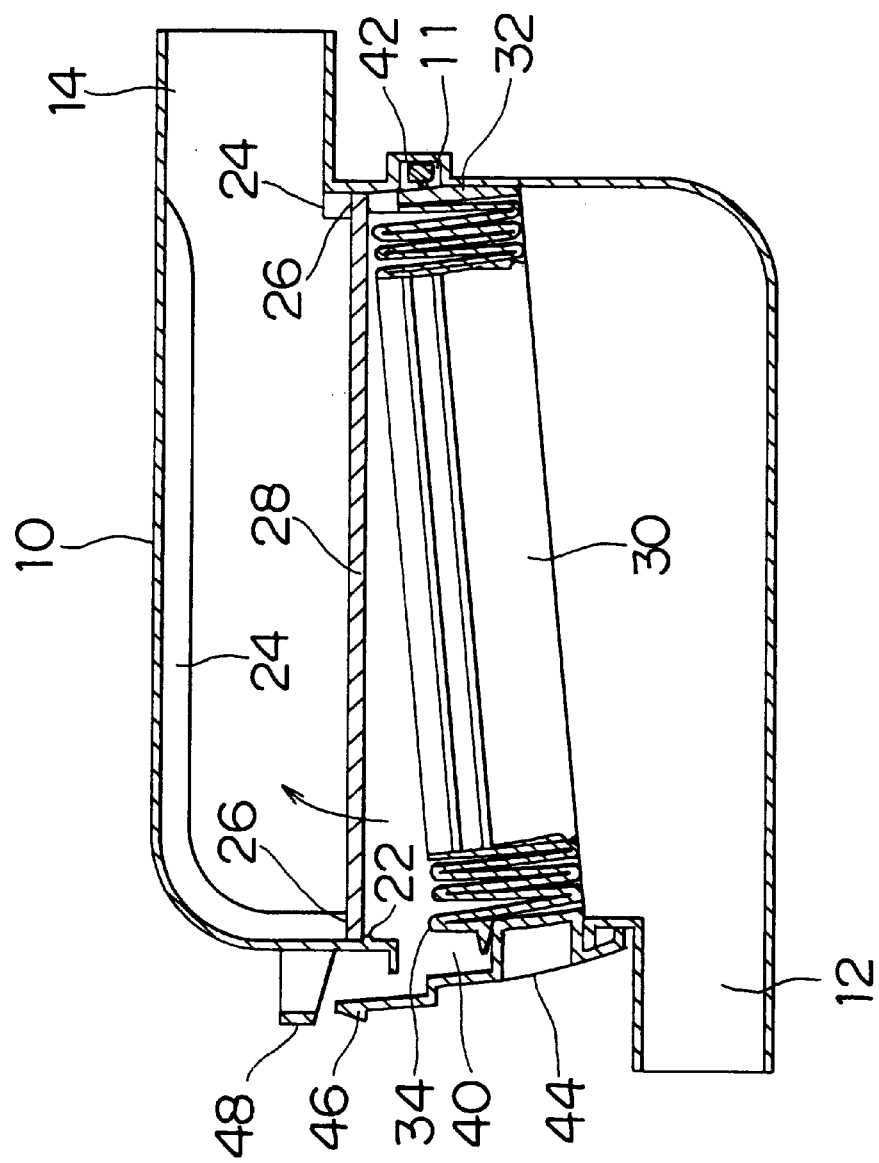
FIG. 5 is a sectional view of an air cleaner in accordance with a second embodiment of the invention.

A second embodiment of the invention will be described with reference to FIG. 5. FIG. 5 is a sectional view of an air cleaner, illustrating a state where an air cleaner element 30 is mounted to a housing 10. The housing 10 of the second embodiment is of an integral structure type, in which a portion of a side wall of the housing 10 has an opening 40 for inserting the absorber member 28 and the air cleaner element 30. Firstly, the absorber member 28 is disposed within the housing 10 by inserting the absorber member 28 through the opening 40. Using a stopper portion 22 formed on an inner wall of the housing 10, the absorber member 28 is tentatively attached inside the housing 10 as in the first embodiment.

An outer peripheral frame 32 of the air cleaner element 30 has a presser portion 34 as in the first embodiment. Furthermore, the outer peripheral frame 32 has a cover portion 44 for closing the opening 40 from outside, and a hinge 42 that is disposed opposite from the cover portion 44. To mount the air cleaner element 30, the air cleaner element 30 is disposed and set in the housing 10 via the opening 40, starting at a side of the hinge 42. After that, the hinge 42 is positioned to a recess 11 formed in the inner wall of the housing 10. While this state is maintained, the air cleaner element 30 is turned about the hinge 42 in a direction indicated by an arrow in FIG. 5, so that the cover portion 44 closes the opening 40. The thus-established state is maintained by a claw 46 formed on the cover portion 44 being engaged with a claw receptacle 48 formed on an outer wall of the housing 10.

Thus, the mounting of the air cleaner element 30 into the housing 10 is completed, and the housing 10 is tightly closed. At the same time, the presser portion 34, extending beyond the stopper portion 22, presses the outer peripheral portion of the absorber member 28 against the seat portions 26. Thus, the absorber member 28 is mounted within the housing 10 in a due state. Therefore, according to the second embodiment, too, by mounting the air cleaner element 30 to the housing 10, the two members, that is, the air cleaner element 30 and the absorber member 28, are mounted in a due state. Thus, the second embodiment achieves substantially the same functions and advantages as mentioned above. Portions of the second embodiment are substantially the same as those of the first embodiment, except the type of the housing 10 and the means for mounting the air cleaner element 30 to an interior of the housing 10. Therefore, description of those portions is omitted.

Figure 6:
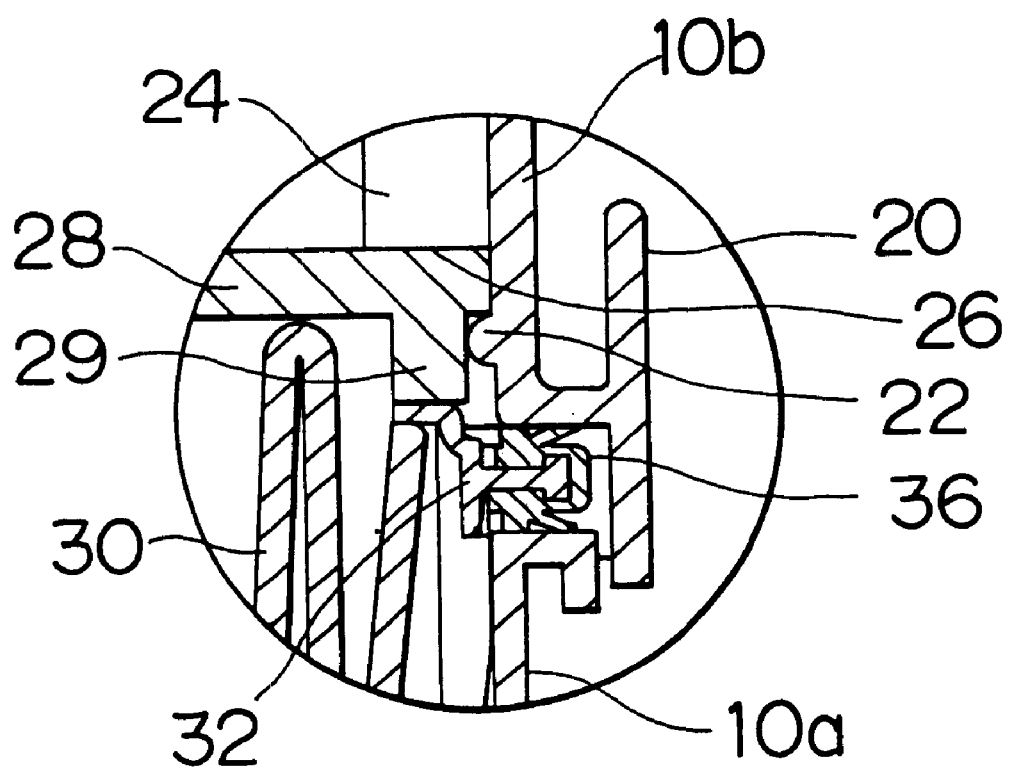
FIG. 6 is an enlarged sectional view of a portion of an air cleaner in accordance with a third embodiment of the invention, corresponding to the view of FIG. 3.

A third embodiment will next be described with reference to FIG. 6. FIG. 6 is an enlarged sectional view of a portion of an air cleaner, corresponding to the view of a portion of the first embodiment in FIG. 3. As is apparent in FIG. 6, a presser portion 29 is formed on an absorber member 28 in the third embodiment, instead of the presser portion 34 of the air cleaner element 30. When the absorber member 28 is tentatively attached within a upper housing 10b, to a site located inwardly of a stopper portion 22, the presser portion 29 extends beyond the stopper portion 22 and reaches the vicinity of an opening of the upper housing 10b.

When the air cleaner element 30 is mounted within the housing 10 in a manner as described above in conjunction with the fist or second embodiment, the outer peripheral frame 32 of the air cleaner element 30 contacts an end surface of the presser portion 29, so that, via the presser portion 29, an outer peripheral portion of the absorber member 28 is pressed against the seat portions 26. This state is retained. Therefore, in this embodiment, too, by mounting the air cleaner element 30 to the housing 10, the mounting of the absorber member 28 is also completed as in the first and second embodiments. This presser portion 29 is also provided with a rigidity that matches the rigidity of the seat portions 26, by hardening the presser portion 29 through pressing or a different process.

Although in the first, second and third embodiments, the absorber member 28 is disposed downstream of the air cleaner element 30, that is, at the outlet port 14-side within the housing 10, it is also possible to adopt a construction in which the absorber member 28 is disposed upstream of the air cleaner element 30.

While the invention has been described with reference to what are presently considered to be preferred embodiments thereof, it is to be understood that the invention is not limited to the disclosed embodiments or constructions. On the contrary, the invention is intended to cover various modifications and equivalent arrangements.

What is claimed is:

1. An air cleaner in which an element for filtering an intake air and an absorber member for absorbing fuel vapor are disposed within a housing, the air cleaner comprising:

a stopper portion for tentatively attaching the absorber member, the stopper portion being formed near a site at which the element is mounted, within the housing;

a seat portion formed within the housing, the seat portion being capable of receiving the absorber member at a side opposite from the stopper portion; and a presser portion that is formed on at least one of the element and the absorber member and that retains the absorber member in a state where the absorber member is pressed against the seat portion when the element is mounted within the housing, wherein the absorber member is retained only at its outer periphery.

2. An air cleaner according to claim 1, wherein the stopper portion has a protruded shape having a size that allows the stopper portion to retain an outer peripheral portion of the absorber member to an inner wall of the housing to such a degree that the outer peripheral portion does not fall apart from the housing.

3. An air cleaner according to claim 2, wherein the stopper portion has an arcuate sectional shape.

4. An air cleaner according to claim 2, wherein the stopper portion has a triangular sectional shape.

5. An air cleaner according to claim 1, wherein the seat portion is an end portion of a rib extending on an inner wall of the housing substantially in a direction of a flow of the intake air.

6. An air cleaner according to claim 1, wherein the presser portion has a rigidity corresponding to the seat portion of the housing.

7. An air cleaner according to claim 6, wherein the presser portion is formed by hardening an end portion of the element through pressing.

8. An air cleaner according to claim 6, wherein the presser portion is formed by hardening an end portion of the absorber member through pressing.

9. The air cleaner according to claim 1, wherein the presser portion is formed on at least one of a first portion of the element and the outer periphery of the absorber member, the first portion being dimensionally at the outer periphery of the absorber member when the air cleaner is assembled, wherein the element presses via the presser portion, the outer periphery of the absorber member against the seat portion.

* * * * *